United States Patent [19]

Gratzer

[11] Patent Number: 5,102,068
[45] Date of Patent: Apr. 7, 1992

[54] SPIROID-TIPPED WING

[76] Inventor: Louis B. Gratzer, 2201 3rd Ave. #2004, Seattle, Wash. 98121

[21] Appl. No.: 660,651

[22] Filed: Feb. 25, 1991

[51] Int. Cl.$^5$ .............................................. B64C 3/10
[52] U.S. Cl. .................................. 244/35 R; 244/199; 244/45 R
[58] Field of Search ................ 244/34 R, 35 R, 45 R, 244/199, 200, 198

[56] References Cited

U.S. PATENT DOCUMENTS

| | | |
|---|---|---|
| 994,968 | 6/1911 | Barbaudy . |
| 1,050,222 | 1/1913 | McIntosh . |
| 1,841,921 | 1/1932 | Spiegel . |
| 2,576,981 | 12/1951 | Vogt . |
| 2,775,419 | 12/1956 | Hlobil . |
| 2,805,830 | 9/1957 | Zborowski . |
| 3,029,018 | 4/1962 | Floyd, Jr. . |
| 3,128,371 | 4/1964 | Spaulding et al. . |
| 3,270,988 | 9/1966 | Cone, Jr. . |
| 4,108,403 | 8/1978 | Finch .................................. 244/199 |

FOREIGN PATENT DOCUMENTS

| | | |
|---|---|---|
| 418656 | 12/1910 | France ........................... 244/45 R |
| 726674 | 6/1932 | France ............................ 244/199 |

Primary Examiner—Galen Barefoot

[57] ABSTRACT

The spiroid-tipped wing, in its basic form, comprises a wing-like lifting surface and a spiroidal tip device (i.e., spiroid) integrated so as to minimize the induced drag of the wing-spiroid combination and/or to alleviate noise effects associated with concentrated vorticity wakes that trail from lifting surfaces. The ends of the spiroid are attached to the wing tip at approproate sweep and included angles to form a continuous and closed extension of the wing surface. For a fixed wing aircraft the spiroid configuration on the right side is of opposite hand to that on the left side. The spiroid geometry incorporates airfoil cross sections with specified thickness, camber and twist. The airfoil thickness varies in relation to the local sweep angle being a minimum at an intermediate position where the sweep angle is zero. The camber and twist vary approximately linearly and change sign at some intermediate position between the spiroid ends so as to produce the optimum spiroid loading. Increasing the size of the spiroid in relation to the overall span of the lifting surface is used to further reduce drag and noise. The concept of the spiroid-tipped wing may include the use of more than one spiroid on each wing tip in any number of forms which may be selected to be adaptable to other design requirements and operational limitations. More generally the spiroid wing tip system is a generic geometric concept which can be adapted to achieve drag reduction and noise for most applications which incorporate wings or wing-like devices (i.e., lifting surfaces) such as helicopters, propellers, etc. including non-aeronautical applications.

6 Claims, 6 Drawing Sheets

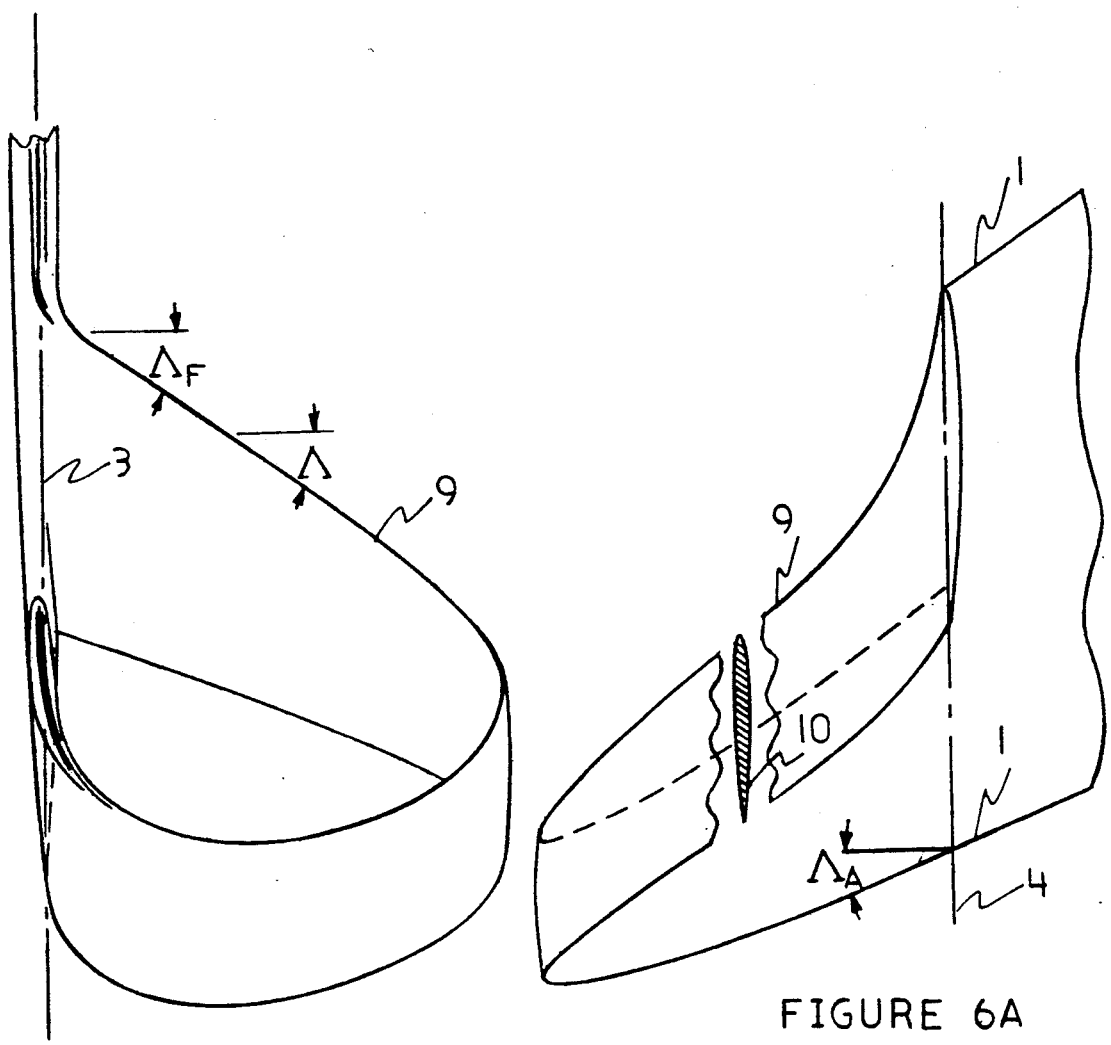
FIGURE 6C
FIGURE 6A
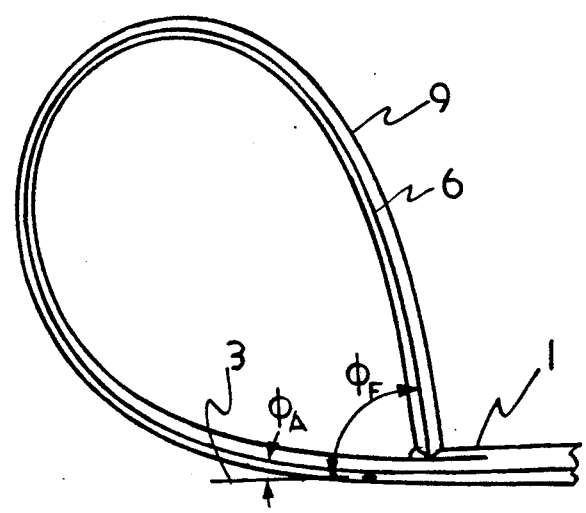
FIGURE 6B

SPIROID-TIPPED WING

BACKGROUND OF THE INVENTION

1. Field

The subject invention is in the field of lifting surfaces particularly those incorporated in aircraft or aeronautical propulsion systems. More specifically it is in the field of wing tip devices used with aircraft wings to minimize induced drag and alleviate noise effects associated with concentrated vorticity wakes that trail from lifting surfaces.

2. Prior Art

The patents listed below constitute a representative listing of the prior art in this field.

| U.S. Pat. No.: | |
|---|---|
| 994,968 | G. Barbaudy |
| 1,050,222 | A. M. McIntosh |
| 1,841,921 | Spiegel |
| 2,576,981 | Vogt |
| 2,775,419 | Hlobic |
| 2,805,830 | Zborowski |
| 3,029,018 | Floyd |
| 3,128,371 | Spaulding et al |
| 3,270,988 | C. D. Cone |

The drag of an aircraft wing arises from a number of sources of which that associated with the trailing vortex system is a major portion-approaching one-half the total drag for a subsonic aircraft in optimum cruise flight. It has long been recognized that this so-called induced drag is directly associated with wing lift and load variation along the span. This condition corresponds to a flow which appears as vorticity shed downstream of the wing trailing edge (i.e., the trailing vortex system) that is particularly intense near the wing tip. The induced drag depends on the following parameters in a manner conveniently expressed as follows:

$$\text{Induced Drag} = K_i(\text{lift})^2/\pi q(\text{span})^2$$

where
q is $$\text{dynamic pressure} = \frac{\rho}{2} V^2$$

and,
ρ=air density
V=flight velocity
also,
$K_i$=induced drag factor

The induced drag factor, $K_i$ depends on the spanwise loading and the configuration of the lifting system. For a planar wing the elliptic loading is optimum and $K_i=1.0$. However, it is also known that the minimum induced drag is less for wing configurations with increased ratios of total trailing edge length to span. Examples include monoplanes with tip winglets or endplates, multiplanes of various types (e.g., biplane, triplane) and various forms of arched lifting surfaces, either open or closed. Also assorted tip devices involving the use of multiple surfaces have been proposed for application to monoplanes or multiplanes. Most of the above are not particularly efficient or useful for various reasons including excessive structural weight, high loads, concomitant drag sources, and operational limitations. Thus, with the exception of the monoplane with winglets, they find very little use today. Several forms of winglets are currently in use for special applications where span and operational space may be limited or where existing configurations may benefit from their application. However it has not been generally established that winglets are preferable to or more efficient than simple wing span extensions to limit induced drag. In many cases their benefit is marginal or even cosmetic.

The object of the present invention is to employ the basic principle whereby the ratio of trailing edge length to wing span is maximized, particularly near the wing tip where this strategy is most effective, thereby substantially reducing induced drag. A further objective is to maintain favorable structural and operational characteristics without creating other sources of drag. More generally, the aim is to provide a generic geometric concept which can be adapted to achieve various levels of drag reduction consistent with the design objectives and requirements for any application which uses wings or wing-like elements e.g., helicopters, propellers, etc., including non-aeronautical applications.

SUMMARY OF INVENTION

The subject invention is for a wing incorporating a tip device consisting of a spiroidal surface i.e., spiroid, attached to each wing tip whose ends blend smoothly with the wing tip at their attachment locations. This yields a closed, structurally continuous contour of ovular shape when viewed along the airstream direction. For a fixed wing aircraft, such devices would be installed on each side with right and left hand configurations on opposite tips. FIGS. 1A (plan view) 1B (rear view) and 1C (side view) illustrate the essential geometric features of such a device configured to yield minimum induced drag for given wing dimensions and total lift. The lateral and vertical dimensions of the spiroid may have any values consistent with the overall design objectives and practical considerations which may limit the spiroid size and form. The spiroidal reference axis is defined as the wing tip chord for purposes of this discussion. The forward end of the spiroid, usually with chord somewhat greater than half the wing tip chord, is attached to the forward portion of the wing tip while the aft end, also having about half the wing chord, is attached to the aft portion of the wing tip. The spiroid cross sections (e.g., as at 5 in FIG. 1A) are airfoils of specified thickness and camber and twist. This results in a twisted and cambered surface to produce the optimum distribution of load on the spiroid surface. In combination with the appropriate wing lift distribution, this will yield minimum induced drag for given total lift and wing span.

The basic function of the spiroid configured in this way is described here with reference to FIGS. 2 and 3. FIG. 2 shows a typical wing operating at velocity V and angle-of-attack, α of the reference airfoil section A. The lift is distributed along the span in approximately elliptic fashion as designated by curve E. Also, the vorticity in the wake W, typical elements of which are designated by T, leaves the wing from its trailing edge. The vorticity wake is essentially represented by continuous sheet in which intensity varies in proportion to the rate of change of lift along the wing span; thus there is a high concentration of vorticity near the wing tip. At some distance downstream, the vorticity sheet rolls up as illustrated at wake section S. This finally leads to the formation of two concentrated vortices far downstream. The elliptic loading and the corresponding wake vorticity pattern result in minimum induced drag for a planar monoplane. FIG. 3 shows an oblique view of a typical wing with spiroid devices installed. The trailing vorticity sheet W is now distributed more uniformly over a larger lateral distance (i.e., trailing edge length) thus avoiding the high concentration of vorticity associated with planar wing tips. The intensity of the roll-up process is drastically reduced and the lower energy thus left in the wake corresponds to lower induced drag. It should be noted that the spiroid device has superior effectiveness primarily because it avoids high concentrations of wake vorticity associated with normal wing tips or indeed any type of wing tip device which has exposed tips. Furthermore, noise associated with the concentrated trailing vortices will be substantially alleviated, particularly in situations where interference with the wake by other moving surfaces is involved. With larger lateral and/or vertical dimensions of the spiroid, the trailing edge length can be further extended thereby providing more reduction of the intensity levels of the vorticity sheet. In all cases the camber and twist of the spiroid will be selected to minimize drag. The intention is described in more detail with reference to the attached drawings.

BRIEF DESCRIPTION OF THE DRAWINGS

FIG. 6A is a plan view of the left end of a spiroid-tipped wing having a spiroid with an included angle near 90° at its leading end and an included angle near 0° at its trailing end.

FIG. 6B is a rear view of the spiroid-tipped wing shown in FIG. 6A.

FIG. 6C is a left-hand side view of the spiroid-tipped wing shown in FIG. 6A.

DETAILED DESCRIPTION OF INVENTION

Figure 1C:
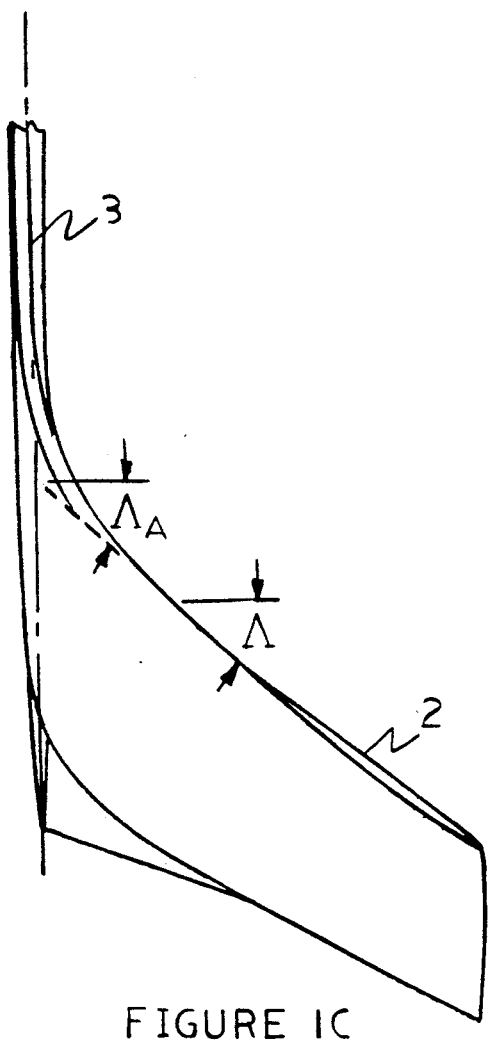
FIG. 1C is a left-hand side view of the spiroid-tipped wing shown in FIG. 1A.
Figure 1A:
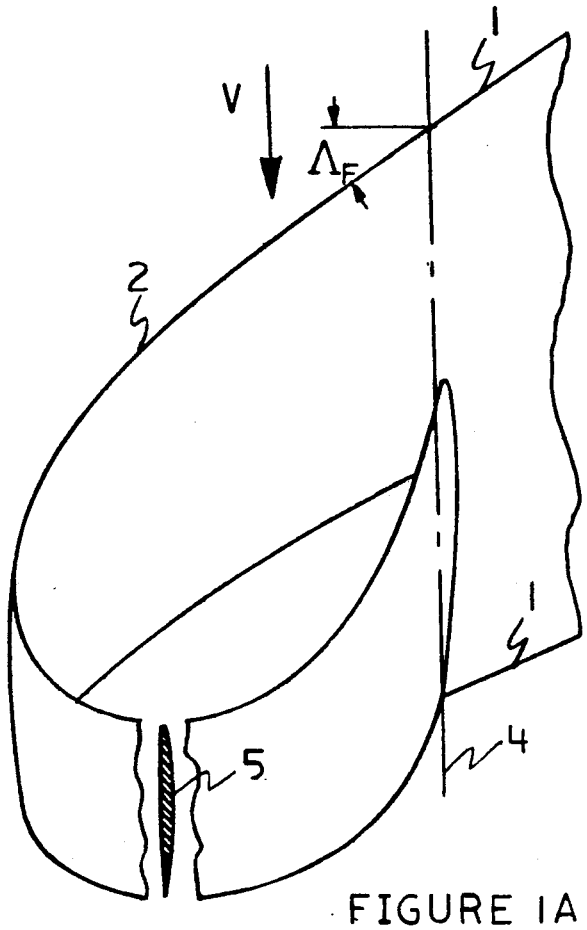
FIG. 1A is a plan view of the left end of a spiroid-tipped wing having a spiroid with an included angle near 0° at the forward end and an included angle near 90° at the aft end.
Figure 1B:
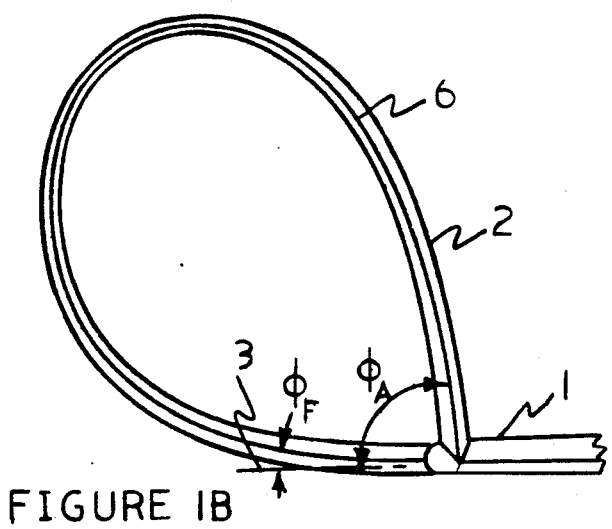
FIG. 1B is a rear view of the spiroid-tipped wing shown in FIG. 1A.
Figure 2:
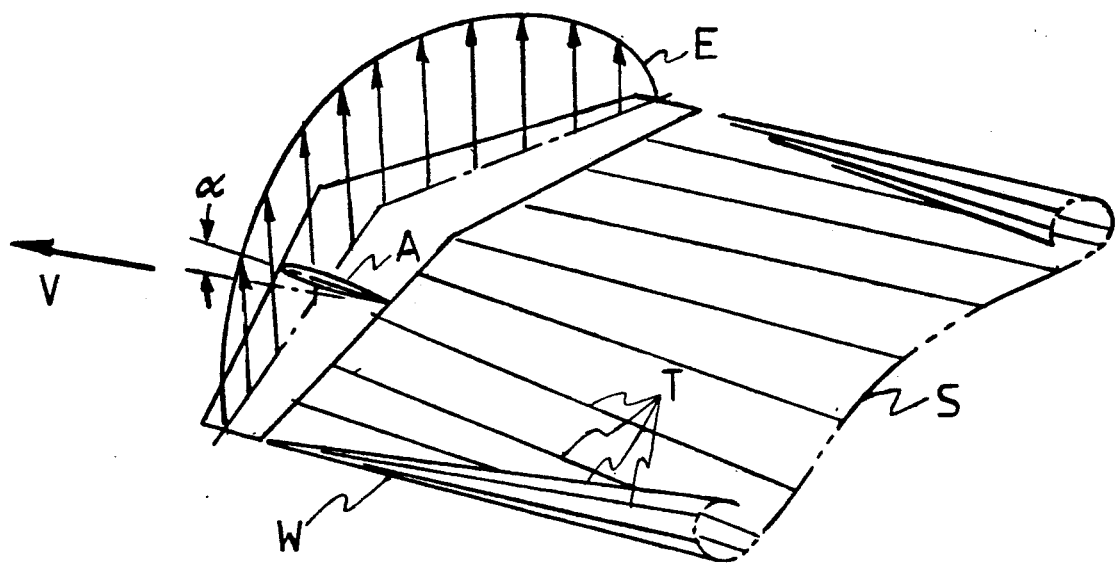
FIG. 2 is an oblique view of a monoplane wing showing a typical load distribution and the corresponding trailing wake structure.
Figure 3:
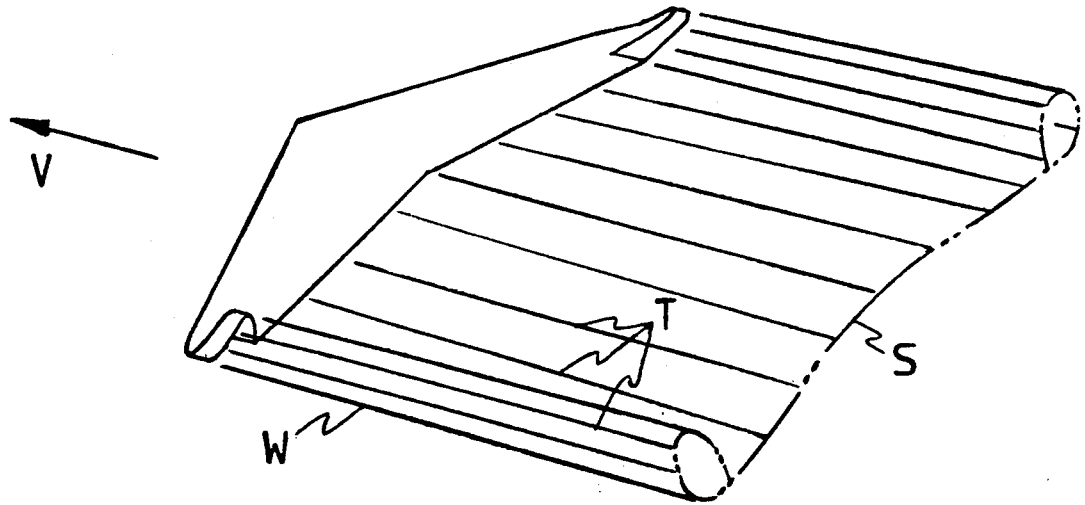
FIG. 3 is an oblique view of a spiroid-tipped wing showing the trailing wake structure associated with optimum load distribution on the wing.
Figure 4:
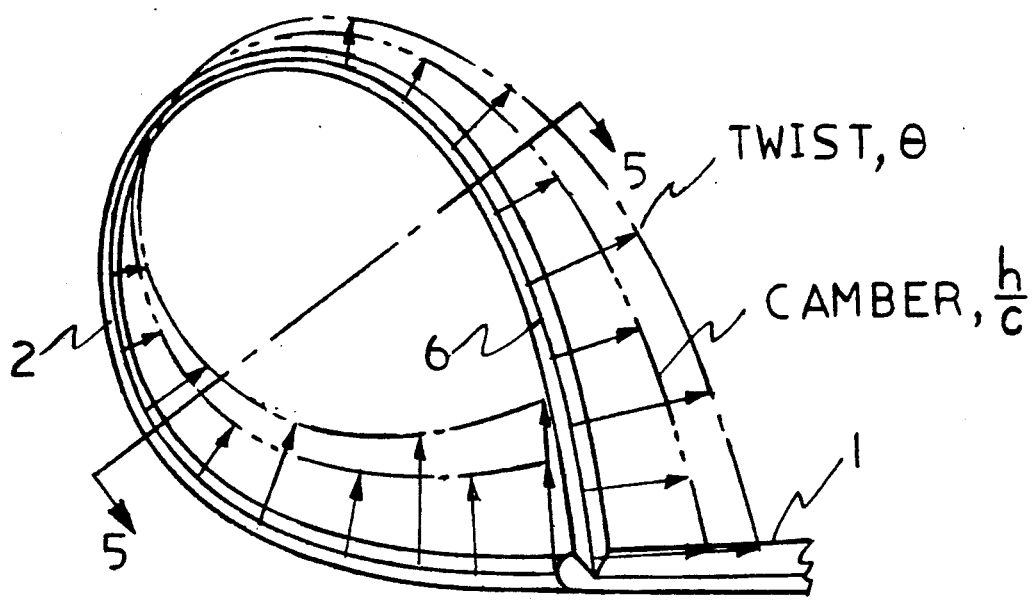
FIG. 4 is a rear view of the left end of a spiroid-tipped wing illustrating the distribution of camber and twist along the surface.
Figure 5:
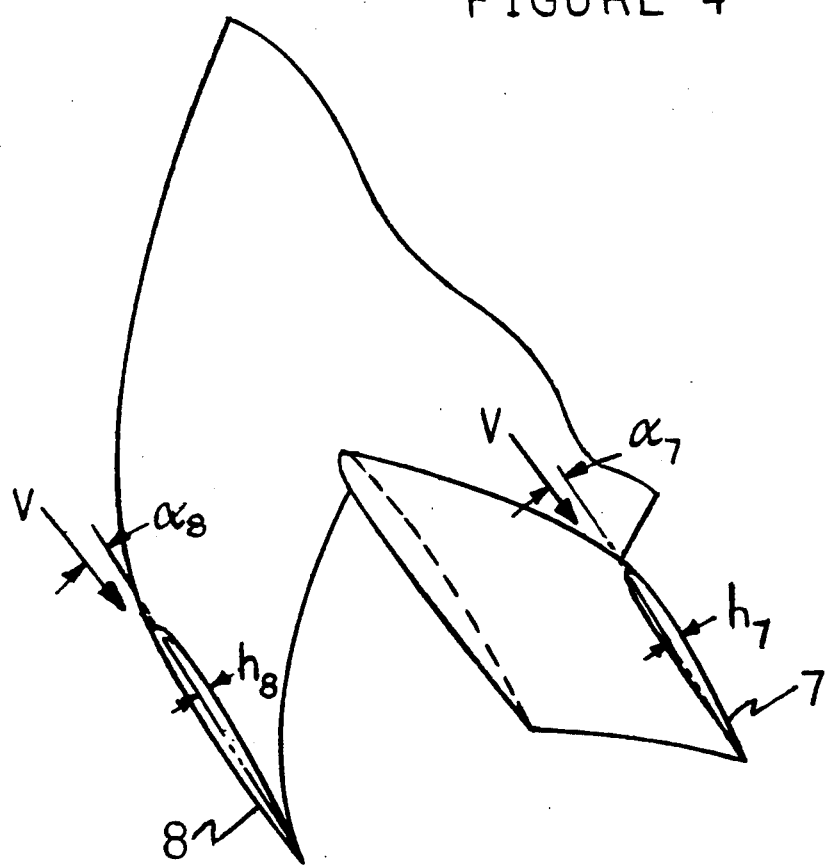
FIG. 5 is a cross sectional view taken from FIG. 4 showing relationships between typical cross sections and the streamwise flow.

As shown by the drawings, I have chosen to illustrate the essential features of the invention using several spiroidal wing tip arrangements. FIGS. 1A, 1B and 1C show a typical wing end portion 1 with a single spiroid 2 attached thereto. Each spiroid end joins the wing at an appropriately selected sweep angle $\Delta$, measured relative to the wing tip chordline 4 and included angle $\phi$, measured relative to the projected wing plane 3. The subscript F or A is used to designate the forward or aft end respectively, as shown in FIGS. 1A, 1B and 1C. These included angles, which may be either positive or negative, are chosen to control the spiroid ovality (as seen in rear view) and its vertical projection either above or below the wing. The spiroid surface cross sections are airfoils having specified thickness, camber and orientation or twist of which a typical airfoil section 5 is shown inset in FIG. 1A. The spiroid chord, which is a function of distance along a spiroidal generator 6, decreases approximately linearly from slightly more than half the wing tip chord at its forward end to about 0.3 of the wing tip chord at the spiroid midpoint; thereafter it increases approximately linearly to about half the wing tip chord at its aft end. The spiroid airfoil sections vary continuously in thickness, camber and twist along the spiroid from end to end. This produces a specific load distribution which, in combination with the wing load distribution, results in minimum induced drag. These variations are illustrated by FIG. 4 in which airfoil camber h/c and twist angle $\theta$ are plotted (positive values outward) using a spiroid surface generator 6 as independent coordinate. This combination will produce an approximately linear variation in loading (proportional to angle-of-attack) which passes through zero near the spiroid midpoint. FIG. 5 is a cross sectional view of the spiroid taken at 5—5 in FIG. 4. This illustrates important relationships between typical airfoil sections 7 and 8 and the corresponding angles-of-attack $\alpha_7$ and $\alpha_8$.

The spiroid shape is also chosen to provide sufficient sweepback (which varies along the spiroid) to minimize aerodynamic interference, to maintain acceptable high-speed characteristics amd to avoid premature drag-rise of the wing tip device with increasing Mach number. This is best achieved by keeping the leading edge sweep angles ($\Delta_F$ and $\Delta_A$), measured relative to the spiroid axis at the forward and aft ends of the spiroid, at values close to that of the wing leading edge as shown in FIG. 1C. Although this approach results in zero sweep at some intermediate point on the spiroid, no adverse effect results because this point occurs where the load is near zero and the airfoil thickness is minimum.

While the preferred embodiment of the invention is shown in FIGS. 1A to 1C, it will be apparent to those versed in the aerodynamic art that, on the basis of the preceding teaching, there is a variety of geometries employing the same principles which could provide similar performance benefits. Several such variations are shown in FIGS. 6A through 8B. However, all would require the ovular closed contour (rear view) and airfoil sections with appropriate camber, thickness and twist to achieve the optimum loading for minimum induced drag.

To be specific, FIGS. 6A to 6C show a spiroid wing tip device 9 which has features similar to those of the basic (preferred) configuration (FIGS. 1A to 1C) with the exception that the forward and aft ends of the spiroid are attached to the wing 1 at included angles which are approximately complementary to those employed in the preferred configuration. This also results in a spiral of opposite sense which can be useful for applications involving more than one spiroid. A typical airfoil section 10 is shown inset in FIG. 6A.

Figure 7A:
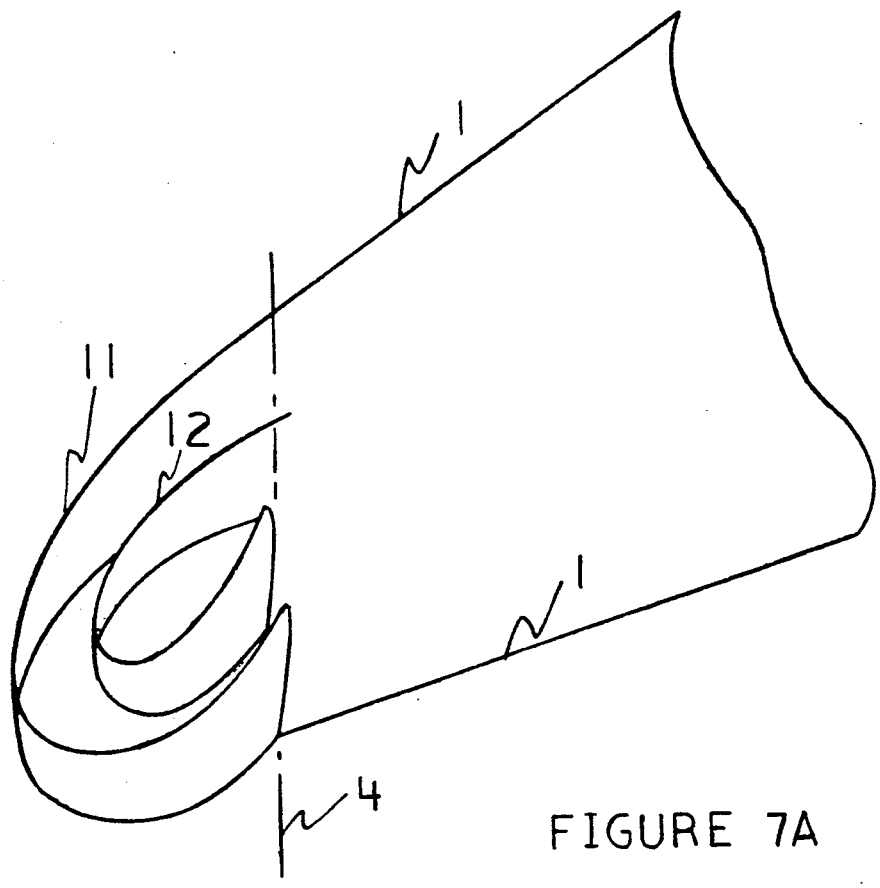
FIG. 7A is a plan view of the left end of a spiroid-tipped wing having two spiroids of the type shown in FIG. 1A.
Figure 7B:
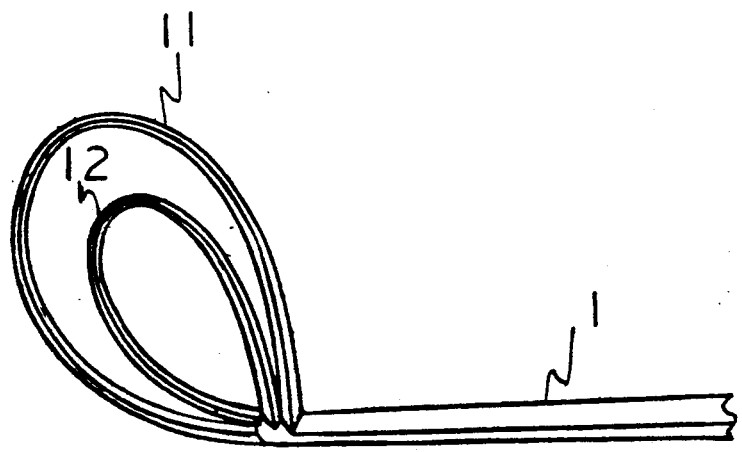
FIG. 7B is a rear view of the spiroid-tipped wing shown in FIG. 7A.

A further variation is shown in FIGS. 7A and 7B as a combination of two spiroids on one wing tip. For the dual spiroid-tipped wing, designated Type A, the inner spiroid 12 is about ⅝ the diameter of the outer spiroid 11 and both spiroids spiral in the same direction. In this case the forward and aft ends of the inner spiroid slightly overlap those of the outer spiroid respectively. In addition, the airfoil sections of each spiroid are selected to provide the optimum loadings that, in combination with the wing loading, will result in minimum induced drag.

Figure 8A:
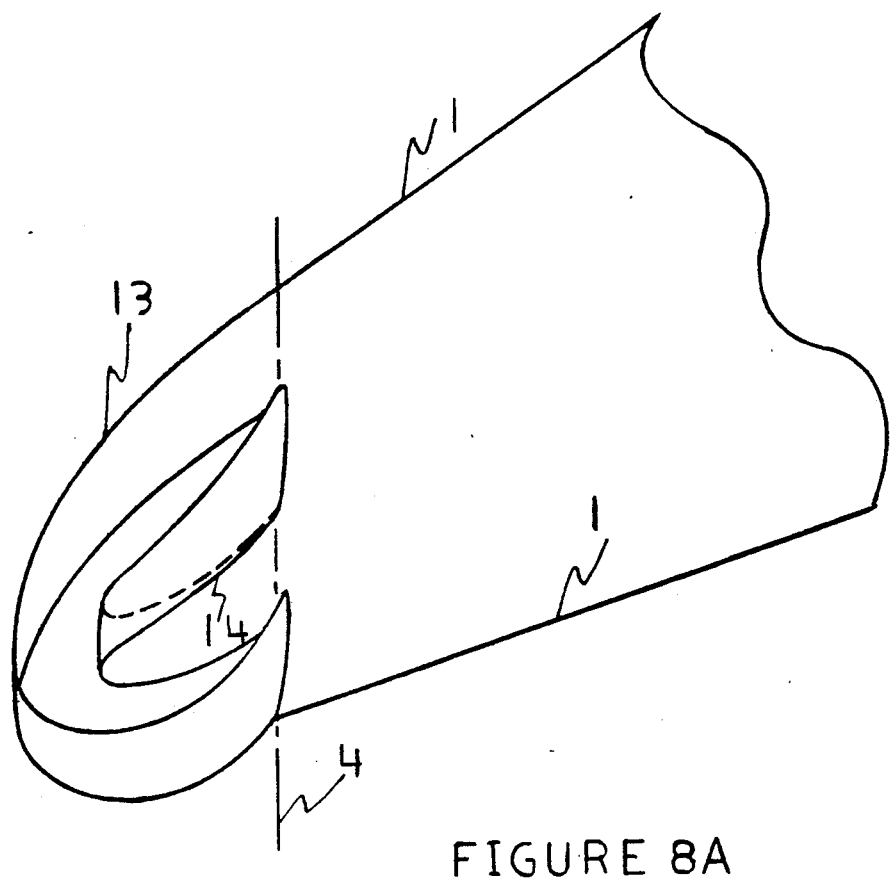
FIG. 8A is a plan view of the left end of a spiroid-tipped wing having two spiroids of the type shown in FIG. 6A.
Figure 8B:
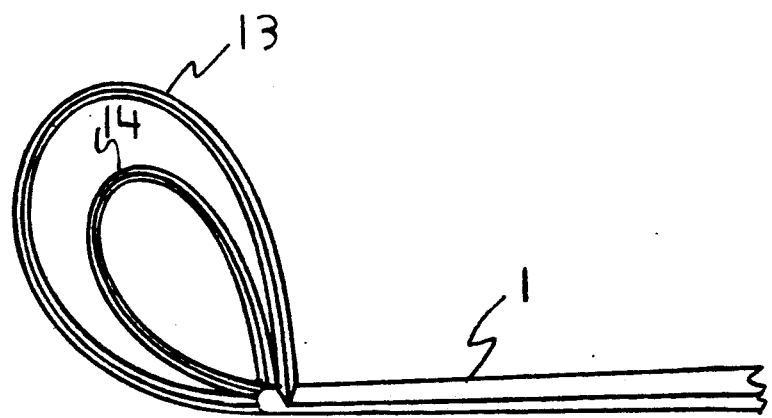
FIG. 8B is a rear view of the spiroid-tipped wing shown in FIG. 8A.

A still further variation of the dual spiroid-tipped wing, designated Type B, is shown in FIGS. 8A and 8B in which the outer spiroid 13 and the inner spiroid 14 spiral in opposite directions. The design qualifications with regard to airfoil sections and surface loading mentioned in the previous case also apply there. It will be apparent to those skilled in the art that the dual spiroid-tipped wing concepts could equally well be implemented with the positions of the basic and complementary spiroids interchanged while maintaining all the previous design qualifications for geometry and loading. Furthermore, although such a combination is not shown, a conception involving more than two spiroids is possible in which the previously described principles would apply. However, this would not be likely be used except possibly for situations where the outer spiroid has a diameter of more than about 0.4 the wing semi-span.

As previously noted, the above descriptions are all in relation to the left-hand wing tip for a fixed wing aircraft. Thus it should be apparent that a complete airplane wing installation will include devices of opposite hand on the right-hand wing tip. It is considered understandable from this disclosure that the subject invention meets its objectives. The spiroid wing tip device greatly reduces the intensity of the wake vorticity trailing from a lifting surface thereby reducing induced drag. Furthermore the reduced wake intensity can substantially alleviate noise generation due to interference of the vorticity with other moving surfaces. More than one spiroid can be used on a wing tip in a variety of combinations to increase the overall effectiveness without exceeding certain geometric or operational limitations. This spiroid wing tip system is adaptable to incorporation in any apparatus or machine which employs lifting surfaces whether static or dynamic. Therefore it can be profitably be applied to helicopters, propeller blades, fans and similar devices.

I claim:

1. A spiroid-tipped wing comprising:
   a wing with at least one tip, and having at least one spiroid on said at least one wing tip;
   said at least one spiroid having forward and aft ends;
   said forward and aft ends being attached to a wing tip at appropriate sweep and included angles to form a continuous and closed extension of said wing surface;
   said at least one spiroid having geometry in the form of airfoil cross sections with thickness, camber and twist;
   said thickness varying in proportion to sweep angle and being a minimum at some intermediate position between said forward and aft ends;
   said camber and twist varying approximately linearly and changing sign at some intermediate position between said forward and aft ends.

2. The spiroid-tipped wing of claim 1 comprising:
   one spiroid attached to each wing-tip;
   the forward end of said spiroid being attached at an included angle in the range of 0° to 3° to the wing tip at its forward portion; and the aft end of said spiroid being attached at an induced angle in the range of 88° to 92° to the wing tip at its aft portion.

3. The spiroid-tipped wing of claim 1 comprising:
   one spiroid attached to each wing tip;
   the forward end of said spiroid being attached at an included angle in the range of 88° to 92° to the wing at its forward portion; and the aft end of said spiroid being attached at an included angel in the range of 0° to 3° to the wing tip at its aft portion.

4. The spiroid-tipped wing of claim 1 comprising:
   two spiroids attached to each wing-tip;
   the forward end of said spiroid being attached at an included angle in the range of 0° to 3° to the wing tip at its forward portion; and the aft end of said spiroids being attached at an included angle in the range of 88° to 92° to the wing tip at its aft portion;
   said spiroids being of unequal size.

5. The spiroid-tipped wing of claim 1 comprising:
   two spiroids attached to each wing tip;
   the forward end of said spiroids being attached at an included angle in the range of 88° to 92° to the wing tip at its forward portion; and the aft end of said spiroids being attached at an included angel in the range of 0° to 3° to the wing tip at its aft portion;
   said spiroids being unequal in sized.

6. The spiroid-tipped wing of claim 1 comprising:
   two spiroids attached to each wing-tip;
   wherein one of said spiroids has the forward end of said one spiroid being attached at an included angle in the range of 0° to 3° to the wing tip at its forward portion; and the aft end of said one spiroid being attached at an included angle in the range of 88° to 92° to the wing tip at its aft portion;
   wherein the second of spiroids has the forward end of said second spiroid being attached at an included angle in the range of 88° to 92° to the wing tip at its forward portion; and the aft end of said second spiroid being attached at an included angel in the range of 0° to 3° to the wing tip at its aft portion;
   said spiroids being unequal in size.

\* \* \* \* \*